Figure 1:
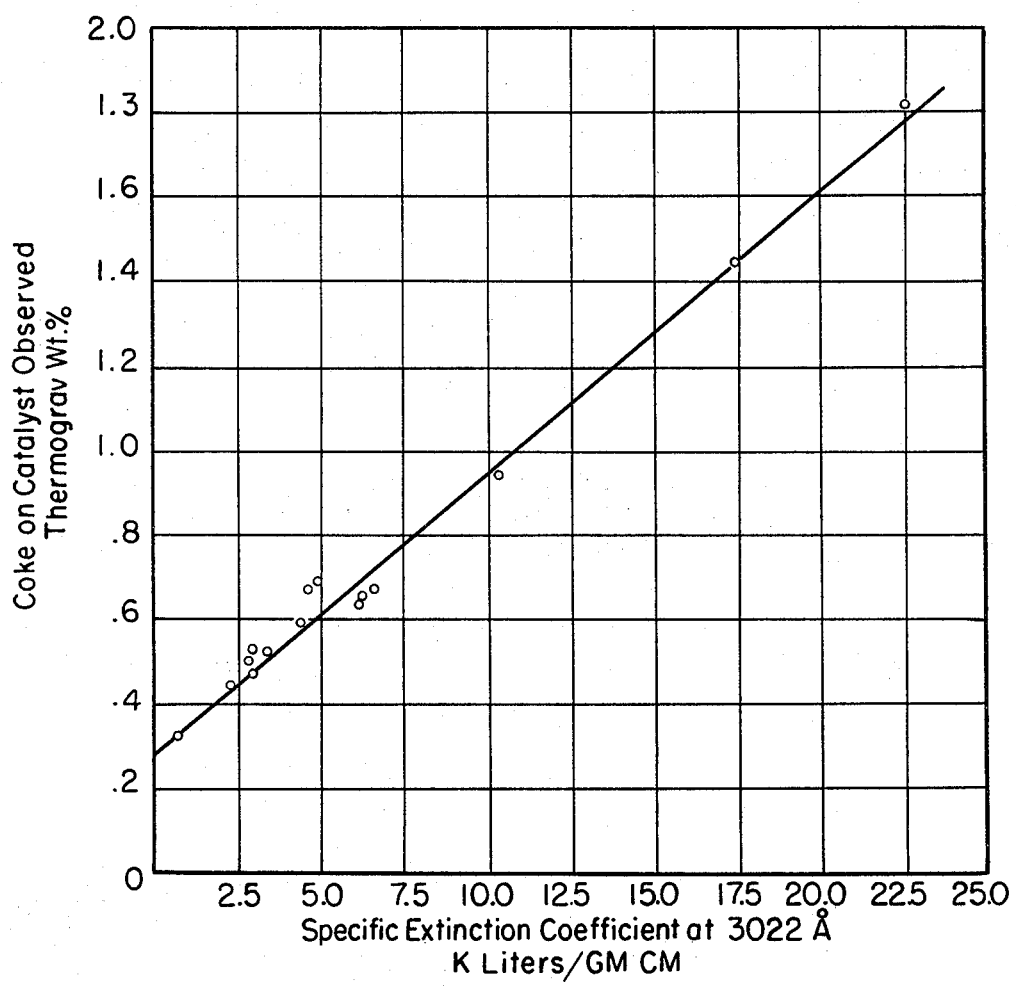

United States Patent Office 3,384,573
Patented May 21, 1968

3,384,573
CONTROL AND CHARACTERIZATION OF
CATALYTIC CRACKING PROCESSES
Robert L. Gorring, Barrington, N.J., assignor to Mobil
Oil Corporation, a corporation of New York
Filed Jan. 14, 1966, Ser. No. 520,572
5 Claims. (Cl. 208—113)

This invention is directed to a method and apparatus for the control of catalytic cracking of hydrocarbons. More specifically, this invention is directed to the application of ultraviolet spectrometric and nuclear magnetic resonance techniques to the control and characterization of hydrocarbon conversion processes. These analysis techniques are used individually or in combination in this invention to predict the cracking characteristics of the feedstocks. In particular, the prediction of coke laydown on catalytic materials is used in a feed forward or feedback control loop to vary process parameters and thereby to greatly improve the present method of hydrocarbon conversion, especially catalytic cracking.

UV theory and technique

It has been known for many years that ultraviolet absorption spectra are of great value in quantitative organic chemistry and in the determination of molecular structures. It has been found that polynuclear aromatic materials have very intense absorption bands in the electromagnetic wavelength range of 2000 to 4000 A. Other materials such as paraffins, naphthenes and monocyclic aromatics exhibit very weak or negligible absorbance in this range. The ultraviolet light used for the present feedstock characterization technique is radiant energy lying in a certain region of the electromagnetic spectrum. The portion of the electromagnetic spectrum of interest in the present context is the near ultraviolet, particularly around 3000 A.

The theory of ultraviolet spectrophotometry is well defined at present and will only be referred to briefly.

When an organic molecule is exposed to a continuous spectrum of electromagnetic radiation, certain wavelengths may be absorbed, causing excitation of the molecule to a higher energy state. The energy difference between these states determines the wavelength of the absorbed light. Many factors influence the difference in energy values between the states. Resonance is important in determining the electronic configuration of both the ground and excited states. This difference fixes the absorption wavelength.

The ultraviolet spectra to be dealt with in the present work are absorption spectra which result largely from transitions of the electrons of molecules to various energy states. The quantum mechanical interpretation of absorption is that energy changes produced by light absorption occur only in integral multiples of a unit of energy. The positioning of these discrete quantum mechanical levels depends on the molecular structure of the absorbing species. Ultraviolet radiation, when passed through organic material will thus be absorbed very strongly at specific wavelengths, called the absorption spectrum. It has been found that certain polycyclic aromatic molecules in petroleum absorb strongly near very specific wavelengths and exhibit a unique absorption pattern.

A basic law in this field is that of Beer, which states that the amount of light absorbed in a layer is proportional to the numbered (concentration) of absorbing molecules in the layer.

(1) $\qquad I/I_0 = T = 10^{-Kcb} = 10^{-(Ecb/M)}$ $I$ = transmitted light intensity
$I_0$ = incident light intensity
$T$ = fraction of light transmitted
$E$ = molar extinction coefficient
$b$ = cell thickness
$c$ = gas oil density
$M$ = molecular weight The quantity log T is referred to as the "log molar extinction coefficient." The quantity $K$ ($=E/M$) is the "specific extinction coefficient." The essence of the ultraviolet technique is to determine the K values over the whole spectrum by determining the transmittances, T, at each wavelength. The apparent K value of a mixture of absorbing and non-absorbing materials is proportional to the concentration of absorbing material. Thus, for example, if we seek the highly absorbing polycyclic aromatics in an otherwise transparent diluent, the apparent K value is proportional to the aromatics concentration.

A typical system of instrumentation used in this invention is the "DuPont 400 Photometric Aanalyzer." This instrument is fully described in a series of publications by the Instrument Products Division of the DuPont Company. It may be designated as an on-line split-beam photometer. The sample stream flows continuously through the sample cell. The term split-beam refers to the division of the incident (diffuse) light into reference and measuring beams after light has passed through the sample. In a typical arrangement, radiation from a selected light source passes through the sample and then into a photometer unit where it is split by a semi-transparent mirror into two beams. One beam is directed to the measuring photometer through an optical filter which removes all wavelengths except the measured wavelength. This wavelength is strongly absorbed by the sample. The second beam falls on the reference photoelectric tube after passing an optical filter which transmits only the reference wavelength. The latter is absorbed only weakly or not at all by the constituent in the sample cell. The photoelectric tubes translate these intensities to proportional electric currents in the amplifier. In the amplifier, correction is made (by logarithmic amplifiers) for the logarithmic relationship between the ratio of the intensities and concentration (or thickness) in accordance with Beer's law. The output is, therefore, linear with sample concentration. Use of the split beam technique implies that changes in light source intensity during analysis, or the presence of bubbles or particulate matter in the sample cell have virtually no effect on the accuracy of the analysis. The presence of any extraneous matter will bias both the reference and measuring wavelengths equally. On-line analyses can be conducted at pressures up to 750 p.s.i. and temperatures up to 700° F. Sample cell thickness range from .002 inch to 24 feet. Response time of about .001 sec. can be attained with suitable cell design. Additional information on ultraviolet instrumentation can be found in "Ultraviolet Spectra of Aromatic Compounds" by Friedel and Orchin.

The present invention

It has been found that the gas-oil coke-forming characterization problem reduces largely to the identification of polycyclic aromatics. There are two large classes—the cata-condensed and the peri-condensed polycyclic aromatics. Examples of the former are anthracene, phenanthrene and chrysene, and examples of the latter are pyrene and fluoranthene. The great majority of polycyclic aromatics have three well-defined band systems in the ultraviolet. For example, in the spectrum of 2,3-dimethylnaphthalene there is a very intense band at 2263 A., log $E$ equal 5.18, at 2778 A. there is a less intense band with log $E$ equal 3.78 and at 3070 A. there is a weak band having log $E$ equal 2.76. These three bands are typical of polycyclic aromatic materials and are called respectively the beta, para and alpha band. The spectrum of 1,2,8-trimethylphenanthrene exhibits these bands at 2604, 3071 and 3375 A. The spectrum of anthracene is shifted further to the longer wavelength. It has now been discovered that there is a unique peak in the ultraviolet spectra at 3000–3050 A. which correlates very well with the catalytic coking characteristics of petroleum hydrocarbons. Less important peaks exist on either side of this main peak, ranging from 2000 to 4000 A. For example, peaks exists at 2250–2300 A. and another at 3800–3900 A. It has been found that there is very little mutual interference between the peaks from the main polycyclic aromatic types at these wavelengths.

Previously, the techniques of ultraviolet spectrophotometry have been directed to analysis of pure organic compounds, including polycyclics. However, cracking feedstocks consist of an enormously complex mixture of substituted (and possibly heterocyclic) aromatics as well as other material, principally naphthenes and paraffins.

its specific gravity, sulfur content, nitrogen content, boiling point range and molecular weight.

Coke on catalyst for each of the charge stocks was determined by a thermogravimetric technique. Thermogravimetric analysis consists of a continuous weight measurement of a solid material through which a gas is flowing. The technique consists of suspending a catalyst in a stream of hydrocarbons and measuring the weight of coke deposited under isothermal conditions. Hydrocarbons are passed through the reactor in which a catalyst basket is freely suspended from a spring. Coke formation increases the weight of the catalyst and displaces the spring whose position is monitored by a transducer. The transducer signal is continuously charted on a recorder via an intermediate demodulator. Catalyst stripping is accomplished by cutting off the oil and passing steam or nitrogen through the reactor. The catalyst is regenerated by passing oxygen-containing gas through the reactor.

TABLE I.—SPECIFIC EXTINCTION COEFFICIENT

| Feedstock | Specific gravity (g./cc.) | Sulfur (weight percent) | Total nitrogen (weight percent) | Boiling range (IBP-95%, °F.) | Molecular weight | K (liters/gm. cm.) at wavelength— | | Conradson carbon (weight percent) | "Standard" coke on catalyst (weight percent) | Predicted coke on catalyst | |
|---|---|---|---|---|---|---|---|---|---|---|---|
| | | | | | | 3022 A. | 2288 A. | | | Three-constant regression | Two-constant regression |
| 1 | .912 | .74 | .041 | 531-770 | 305 | 2.97 | 31.6 | .03 | .525 | .478 | .478 |
| 2 | .878 | .23 | .058 | 569-786 | 326 | 2.82 | 20.2 | .01 | .504 | .477 | .468 |
| 3 | .884 | 1.34 | .0340 | 560-785 | 310 | 3.42 | 29.7 | .01 | .521 | .510 | .508 |
| 4 | .901 | 1.43 | .11 | 669-868 | 366 | 4.43 | 26.6 | .02 | .590 | .582 | .574 |
| 5 | .911 | 2.66 | .064 | 666-841 | 367 | 4.94 | 40.4 | .09 | .688 | .605 | .608 |
| 6 | .922 | .94 | .32 | 400-850 | 268 | 4.57 | 44.1 | .03 | .676 | .576 | .584 |
| 7 | .875 | .13 | .020 | 608-819 | 369 | 2.28 | 16.2 | .01 | .444 | .444 | .432 |
| 8 | .879 | .52 | .0251 | 415-919 | 300 | 2.98 | 27.6 | .16 | .472 | .482 | .479 |
| 9 | 1.000 | .97 | .95 | 600-900 | 340 | 17.5 | 62.5 | 1.70 | 1.45 | 1.45 | 1.44 |
| 10 | .888 | .04 | .0001 | 538-676 | 250 | .67 | 16.9 | .00 | .327 | .333 | .326 |
| 11 | .943 | 2.57 | .085 | 457-749 | 259 | 10.3 | 82.7 | .08 | .943 | .935 | .962 |
| 12 | .996 | 3.14 | .10 | 526-816 | 324 | 22.7 | 75.2 | .90 | 1.82 | 1.79 | 1.78 |
| 13 | .908 | 2.00 | .09 | 410-940 | 288 | 6.13 | 42.8 | .15 | .634 | .684 | .687 |
| 14 | .912 | 2.37 | .09 | 393-879 | 285 | 6.71 | 43.3 | .20 | .674 | .723 | .725 |
| 15 | .910 | 2.27 | .11 | 410-918 | 285 | 6.19 | 41.6 | .20 | .662 | .789 | .691 |

It is thus unusual that a simple and easily applicable feedstock characterization method could be developed with this inherent molecular complexity and large range in molecular weight. The heart of this method which has been discovered is the distinctness of the absorption band at 3022 A. and its use in combination with other bands such as those at 2288 A. and 3850 A. An essential feature of this feedstock characterization technique is the recognition that the ultraviolet spectrophotometer will perform an on-line integration over all the individual polycyclic aromatic types yielding a summed up intensity which is suitably representative of the complex mixture. That is, representative in predicting coke on catalyst. The UV intensity measurements represent a meaningful summed up average of all the molecular species present in the gas oil. This approach is seen to involve the enormous simplification that the individual molecular species do not have to be identified separately.

A further embodiment of this invention involves the combined use of ultraviolet spectrophotometry and nuclear magnetic resonance to characterize petroleum feedstocks. The nuclear magnetic resonance analysis determines the types of hydrogen atoms in the stock and thus yields an indication of the molecular species present. The NMR results yield detailed information regarding the crackability and product spectrum of feedstocks. The combined UV-NMR technique permits an a priori prediction of the individual products (methane through $C_6$ gasoline) for a wide variety of petroleum feedstocks. The nuclear magnetic resonance technique is well known in the art and a disclosure related to its use in the petroleum field may be found in U.S. Patent No. 3,153,756 to Williams et al.

Experimental technique and results

The catalyst employed in the present work was a commercially aged synthetic bead catalyst.

The charge stocks used to coke this catalyst are listed in Table 1. Each charge stock listed is characterized by The same 35.1 gram sample of catalyst was used in each run. Oil was fed to the reactor at 114 cc./hr. (102 gms./hr.) at 950° F. Five cc./min. of nitrogen (STP) was fed with the oil. Thus, the partial pressure of the oil in the reactor was 14.3 p.s.i.a. After each coking run, the catalyst was stripped to completion for 20.0 minutes. The catalyst was regenerated in air by slowly raising the reactor temperature to no higher than 1200° F. until burnoff was complete.

As is well known, "coke" on catalyst consists of slow and fast coke. Slow coke is considered to be the common graphite, turbostratic structure and is taken to be that which is left on the catalyst after stripping to completion. Fast coke is considered to be desorbable hydrocarbon and is defined to be equal to total coke minus slow coke at any time from the beginning of stripping. Consequently, the measure of the charge stock coking characteristic must include both fast and slow coke in order to be practically useful. The quantitative measure of charge stock coking used was the total (fast plus slow) coke on the catalyst after 6.0 minutes exposure to the oil at 950° F. and 45 seconds of stripping (stripping taking place at the coking temperature of 950° F.). This corresponds to a catalyst to oil ratio of 3.55 (lb./lb.) and a space velocity of 2.90 (lb./lb. hr.). This is referred to as "Standard" coke on catalyst.

The UV spectra of the charge stocks were obtained on a Cary Model 14 instrument. The apparent K values at 2288 and 3022 A. were computed from measured transmittances from Eq. 1. Samples were diluted with isooctane to obtain transmittances in the range 10 to 60%. Cell thickness $b$ was 1.00 cm. The experimental K values are shown in Table 1.

The data for the charge stocks of Table 1 were subjected to a least squares regression analysis using the following linear equations.

(2) $\quad Cp^* = A + BK_{2288} + CK_{3022}$
(3) $\quad Cp^* = A + CK_{3022}$ where $Cp^*$ is the predicted coke.

The constants in Eq. 2 were: $A=.302$, $B=.000886$, $C=.0685$, average deviation$=\pm.0318$ wt. percent coke on catalyst. Constants in Eq. 3 were: $A=.282$, $C=.0661$, average deviation$=\pm.0346$ wt. percent coke on catalyst. A summary of the observed vs. computed coke on catalyst for the three and two-constant regressions of Eqs. 2 and 3 is shown in Table I. It can be seen that the two-constant relation of Eq. 3 is almost as good as the three-constant fit from Eq. 2. The average deviation of .0346% coke on catalyst is a small error relative to those associated with regenerator temperature measurements. Thus, the 3022 A. wavelength alone is a very effective means of characterizing feedstocks. This is an extremely fortunate occurrence and greatly simplifies on-line instrument applications. Knowledge of the molecular species detected at 3022 A. is a sufficiently accurate rate indicator of all the other materials present to allow reliable correlation. FIGURE 1 shows the experimental coke data plotted against the absorbance K value at 3022 A. The solid line is the best-fit least squares regression analysis on Eq. 3. In view of the somewhat diverse molecular species associated with each wavelength, it was not obvious that such a connection with a single wavelength could be established.

The intensity maximum does not necessarily occur at 3022 A. However, since this peak is always reasonably flat, a reading at $\pm 50$ A. from the absolute peak maximum does not significantly affect the results. Therefore, a reading of peaks at fixed wavelengths results. Therefore, a reading of peaks at fixed wavelengths results in an accurate analysis.

Additional data for the charge stocks obtained by measurements at 3850 A. were subjected to a least squares regression analysis fit to the linear equation of the form:

(4) $\quad Cp^* = A + BK_{2288} + CK_{3022} + DK_{3850}$

However, the relatively small change in average deviation (.0276% to .0346%) observed in comparing the four- and two-constant fit of Eqs. 3 and 4 indicates that, for on-line control, use of the single wavelength of 3022 A. is indicated.

The data of Table I were subjected to a least squares regression analysis taking into account the concentration of sulfur plus nitrogen in the feedstock. Inclusion of these concentrations reduced the average deviation only a minor amount. Although the inclusion of the sulfur plus nitrogen concentration pulled the correlation together somewhat, the effect was not of major significance.

Figure 2:
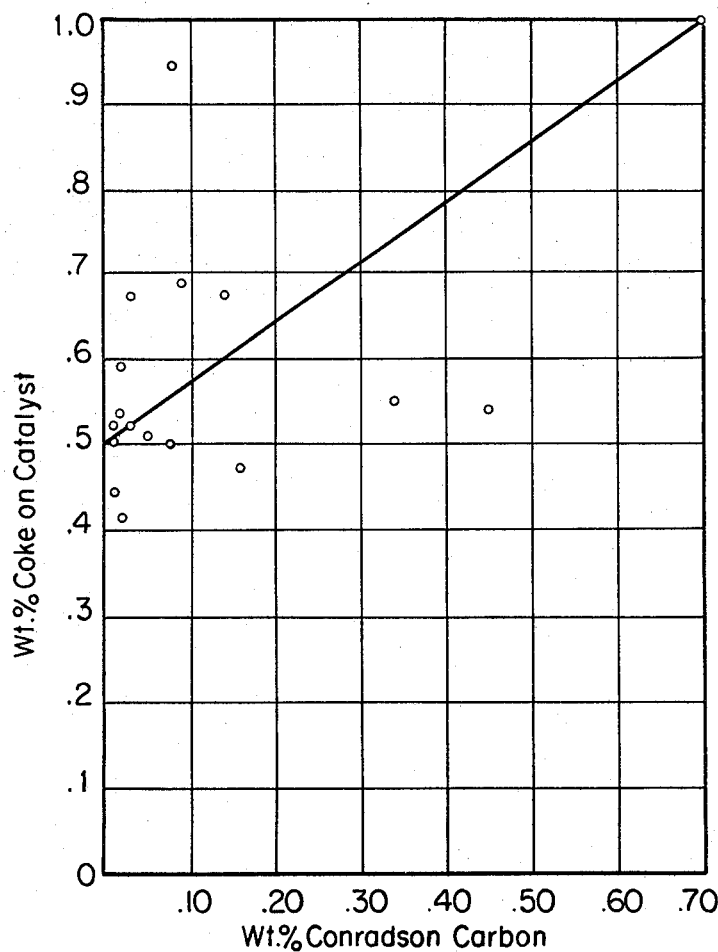

Table I contains data indicating the Conradson carbon content of each of the feedstock. The Conradson carbon test is a procedure for the determination of the amount of carbon residue left after evaporation and pyrolysis of an oil, and is intended to provide some indication of relative coke forming propensities. In this method a weighed quantity of a sample is placed in a crucible and subjected to destructive distillation. At the end of the specified heating period, the test crucible containing the carbonaceous residue is cooled in a desiccator and weighed. The residue remaining is calculated as a percentage of the original sample and reported as Conradson carbon residue. This Conradson carbon residue is a conventionally used feedstock characterization factor which should be distinguished from the catalytic coking characteristic dealt with in the present invention. It has previously been determined that the Conradson carbon residue of a feedstock could be predicted by ultraviolet analysis in the wavelength span of about 3500 to 4000 A. (U.S. Patent No. 3,121,677 to Coggeshall and Norris). However, it has now been found that an analysis for Conradson coke residue is not predictive of coke laydown. This conclusion is supported by a consideration of FIGURE 2 which is a plot of weight percent Conradson carbon vs. weight percent coke on catalyst. FIGURE 2 demonstrates that Conradson carbon offers virtually no useful information on catalytic coking characteristics.

The applicability of the method of this invention to various TCC operations is derived as follows. Formation of total coke on catalyst either in laboratory or commercial units is a function of the following variables:

(1) Type of charge stock. $f_1(S)$
(2) Type of catalyst. $f_2(C)$
(3) Temperature of cracking operation. $f_3(T)$
(4) Partial pressure of oil. $f_4(P)$
(5) Contact time of the catalyst with oil in reactor section. $f_5(t_R)$ The total coke on catalyst (fast plus slow coke) is expressed as a product of the various functions listed above.

(5) $\quad C = [f_1(S)f_2(C)f_3(T)f_4(P)f_5(t_R)]$

Eq. (3) can be written, ($A=.282$, $C=.0661$)

(6) $\quad Cp^* = A + CK_{3022} = A[1 + (C/A)K_{3022}]$

Comparison of Eqs. 5 and 6 reveals that (7) $\quad f_1(S) = A_s[1 + A_k K_{3022}]$ The $f_1(S)$ function may be designated as the "charge-stock characterization function."

The effect of the feedstock only is expressed quantitatively by Eq. 7. The influence of the catalyst type, as embodied in $f_2(C)$ has to be evaluated independently. The influence of catalyst only on coking properties can be taken into account by a "catalyst characterization factor" $A_c$.

(8) $\quad f_2(C) = A_c$

The influence of temperature on total coke on catalyst has been extensively investigated. Fast plus slow coke at conditions corresponding to commercial catalyst circulation rates have been determined over wide temperature ranges.

The function $f_3(T)$, which accounts only for the temperature effects, can be taken to be approximately a constant, namely, unity.

(9) $\quad f_3(T) = 1$ (const.)

The influence of pressure on coke formation has been thoroughly investigated by others. For a specific charge stock, coke on catalyst at fixed on-stream time is a linear function of pressure at pressures above 1 atmosphere.

(10) $\quad C = C_1[1 + A_p(P-1)]$

To extend these results somewhat to apply to partial pressures and any charge stock, the following conclusion can be stated:

(11) $\quad C = C_1[1 + A_p(P_0-1)]$

Or, any charge makes, say 50% more coke at a partial pressure of 1.5 atm. than it does at 1.0 atm. The $f_4(P)$ function in Eq. 5 becomes

(12) $\quad f_4(P_0) = [1 + A_p(P_0-1)]$ which could be considered at the "normalized pressure function".

The evaluation of the effect of catalyst residence time involves determining the form of the function $f_5(t_R)$ in Eq. 5. It has long been known that slow coke forms approximately as the square root of time. However, the situation is more complicated in that both fast and slow coke must be considered.

Experimental investigations have been conducted to determine the effect of catalyst coking and stripping time on total coke on catalyst. The results of these studies show that, between six and ten minutes coking time, the total coke on catalyst from the Total Charge is approximately a linear function of the catalyst residence time in the reactor. This is shown to be true over a wide temperature range. The linearity with residence time is a result of subtle interactions between fast and slow coke in the reactor and stripping section. Thus, the $f_5$ function in Eq. 5 is $$\left(\text{where } \frac{H}{Fc} = \frac{\text{catalyst holdup in the reactor}}{\text{catalyst flow rate}}\right)$$

(13) $f_5(t_R) = [1 + A_r(H/Fc)]$; where $H/Fc = t_R$ which can be designated the "normalized catalyst residence time function."

Substitution of Eqs. 7, 8, 9, 12 and 13 into Eq. 5 yields the final generalized equation for predicting coke make.

(14) $C = A_c A_s [1 + A_k K_{3022}][1 + A_p(P_0 - 1)][1 + A_r(H/Fc)]$

It is obvious that Eq. 13, in any particular case, can be replaced by whatever functional form is indicated by the pertinent experimental data.

NMR technique

A nuclear magnetic resonance analysis can be combined with the UV technique to monitor petroleum feedstocks and control their processing. By means of NMR the hydrogen distribution throughout a gas-oil can be classified according to four types:

$A$ = wt. percent hydrogen on aromatic rings
$B$ = wt. percent hydrogen on carbon α to aromatic ring
$C$ = wt. percent hydrogen on CH and $CH_2$ carbon atoms
$D$ = wt. percent hydrogen on $CH_3$ carbons This breakdown of types of hydrogen is a useful indicator of feedstock quality. Hydrogen in classes A and B is virtually unavailable for conversion into useful products. This is because polycyclic aromatic rings are nearly uncrackable under commercial conditions. Also, side chains on polycyclics usually crack off in the β position, leaving a single carbon attached to the ring. Thus, hydrogens on rings or on carbon atoms α to aromatic rings are either going to end up in the coke or in the very heavy recycle or syn tower bottoms. Thus, they may be discounted as being essentially unavailable for conversion into useful product.

The C and D hydrogen classes yield a very good indication of the quality of the gas oil charge. For example, a high ratio of D to C (i.e. $CH_3$ to $CH + CH_2$) indicates either a high degree of chain branching or a short chain length in the paraffinic fraction. A high ratio of C to D indicates a highly naphthenic or long-chain normal paraffin stock. These lines of reasoning can, of course, be extended as far as is desired. However, statistical methods will be used in a specific embodiment to establish quantitative relationships.

As an example of the use of the combined UV and NMR techniques for characterizing catalytic cracking product distributions, the following three tables are presented. They show that the specific products of $C_5^+$ gasoline, propylene and isobutane are very well predicted. The conversions and product distributions were determined from fixed bed cracking over commercially aged catalyst beads at fixed operating conditions for all feedstocks.

TABLE II.—CORRELATION OF $C_5^+$ GASOLINE WITH ULTRAVIOLET SPECTROPHOTOMETRY AND NUCLEAR MAGNETIC RESONANCE

| Feedstock [1] | $X_1$ | $X_2$ | $X_3$ | $X_4$ | $X_5$ | $C_5^+$ Gasoline yield (Wt. percent of charge) | |
|---|---|---|---|---|---|---|---|
| | | | | | | Predicted | Observed |
| 10 | .67 | 5.9 | 3.2 | 47.8 | 43.1 | 41.0 | 41.5 |
| 2 | 2.82 | 2.8 | 8.3 | 66.5 | 22.4 | 34.3 | 33.4 |
| 6 | 4.57 | 6.2 | 17.0 | 50.6 | 26.2 | 27.4 | 26.6 |
| 12 | 22.7 | 19.1 | 23.8 | 44.9 | 12.3 | 9.49 | 11.9 |

[1] The feedstock numbers correspond to those in Table I.

where, $X_1$ = UV absorbance K (Liters/gm. cm.) at 3022 A.
$X_2$ = wt. percent hydrogen on aromatic ring by NMR
$X_3$ = wt. percent hydrogen on carbon α to aromatic ring by NMR
$X_4$ = wt. percent hydrogen in CH and $CH_2$ groups by NMR
$X_5$ = wt. percent hydrogen in $CH_3$ groups by NMR TABLE III.—CORRELATION OF PROPYLENE YIELD WITH ULTRAVIOLET SPECTROPHOTOMETRY AND NUCLEAR MAGNETIC RESONANCE

| Feedstock [1] | $X_1$ | $X_2$ | $X_3$ | $X_4$ | $X_5$ | Propylene yield (wt. percent of charge) | |
|---|---|---|---|---|---|---|---|
| | | | | | | Predicted | Observed |
| 10 | .67 | 5.9 | 3.2 | 47.8 | 43.1 | 4.03 | 4.05 |
| 2 | 2.82 | 2.8 | 8.3 | 66.5 | 22.4 | 3.46 | 3.24 |
| 6 | 4.57 | 6.2 | 17.0 | 50.6 | 26.2 | 1.65 | 1.67 |
| 12 | 22.7 | 19.1 | 23.8 | 44.9 | 12.3 | 1.03 | 1.25 |

[1] The feedstock numbers correspond to those in Table I.

TABLE IV.—CORRELATION OF ISOBUTANE YIELD WITH ULTRAVIOLET SPECTROPHOTOMETRY AND NUCLEAR MAGNETIC RESONANCE

| Feedstock [1] | $X_1$ | $X_2$ | $X_3$ | $X_4$ | $X_5$ | Isobutane yield (wt. percent of charge) | |
|---|---|---|---|---|---|---|---|
| | | | | | | Predicted | Observed |
| 10 | .67 | 5.9 | 3.2 | 47.8 | 43.1 | 4.59 | 4.66 |
| 2 | 2.82 | 2.8 | 8.3 | 66.5 | 22.4 | 2.83 | 2.82 |
| 6 | 4.57 | 6.2 | 17.0 | 50.6 | 26.2 | .917 | 1.06 |
| 12 | 22.7 | 19.1 | 23.8 | 44.9 | 12.3 | .572 | .860 |

[1] The feedstock numbers correspond to those in Table I.

In each case, the predicted values of the product component in question were obtained by regression on an equation involving the five parameters, $X_1$, $X_2$, $X_3$, $X_4$ and $X_5$. The data in Tables 2–4 are illustrative only.

It must be emphasized that *any* suitable linear or non-linear correlating equation may be used to relate UV-NMR to product distribution.

The above results can be extended to processing at other conditions. For example, once the yield of a particular component is known at a given set of conditions, the yield at another set of conditions can be estimated readily by methods well-known to practicing engineers.

Also, this combined UV-NMR technique is applicable to any process used in a refinery or chemical plant. For example, hydrocracking, reforming, etc.

The present method comprises the use of any or all combinations of ultraviolet absorbance wavelengths and/or nuclear magnetic resonance spectral shifts.

The commercial application of the UV and NMR techniques outlined herein is as follows. The feedstock characterization methods are to be used in on-line or off-line control or analysis of a commercial process by means of action undertaken responsive to the indications of the ultraviolet or NMR devices which may be employed together or each separately. The control action may be of the feedforward or feedback type.

A specific embodiment of this invention is to control the temperature distribution in a catalytic cracking process by controlling the rate of recycle responsive to the UV or UV and NMR signal generated from the combined feed to the unit. For example, the generation of a signal representative of a predicted increase in coke formation can be used in maintaining a proper heat balance in the unit by reducing the amount of high coke-forming feed (i.e. recycle rate). Alternatively, the regeneration temperature in a catalytic cracking unit can be controlled in response to the UV or UV and NMR signal by controlling the combustion air rate or cooling air rate to the catalyst regenerator and/or the lift air rate. A further use of the characterization signal generated by the method of this invention is to use it to set the operating conditions of a catalytic cracking unit such as space velocity or catalyst/oil ratio.

This feedstock characterization method is primarily designed for use in determining the product distribution from catalytic cracking and as such, it can be used to control not only the TCC or FCC system, but will be applicable to analysis and control of all downstream facilities such as a gas plant, etc.

The invention has been described in terms of specific embodiments set forth in detail, but it should be understood that these are by way of illustration only and that the invention is not necessarily limited thereto. Alernative constructions will become apparent to those skilled in the art in view of this disclosure, and accordingly, modifications of the apparatus and process disclosed herein are to be contemplated within the spirit of this invention.

What is claimed is:

1. A method for characterizing the coking tendencies of a hydrocarbon material employed in a catalytic cracking operation which comprises subjecting a hydrocarbon material to ultraviolet spectrophotometric analysis by passing light having a wave length in the range of from about 2800 A. to about 3200 A. so as to generate a signal representative of the light absorbing characteristics and thus the coking tendencies of the hydrocarbon material and employing the signal thus generated to control at least one of (a) hydrocarbon feed rate to the process, (b) combustion air rate to the regenerator and, (c) catalyst circulation rate in the process.

2. The method of claim 1 wherein said light has a wave length in the range of 3022 A. ± 50 A.

3. The method of claim 1 wherein the hydrocarbon feed is subjected to light wave lengths in the range of from about 3000 A. to about 3050 A.

4. The method of claim 1 wherein said ultraviolet spectrophotometric analysis is used in conjunction with a nuclear magnetic resonance analysis to characterize said hydrocarbon feed.

5. The method of claim 4 wherein said ultraviolet spectrophotometric analysis employs a wave length of 3022±50 A. and said nuclear magnetic resonance analysis generates a signal which identifies the hydrogen-carbon groupings of the hydrocarbon charge and thus the crackability of the feedstock.

References Cited

UNITED STATES PATENTS

| | | | |
|---|---|---|---|
| 2,547,212 | 4/1951 | Jamison et al. | 250—83.3 |
| 3,152,980 | 10/1964 | Coonradt et al. | 208—78 |
| 3,153,756 | 10/1964 | Williams et al. | 324—105 |
| 3,162,595 | 12/1964 | Szepe | 208—87 |

ABRAHAM RIMENS, *Primary Examiner.*